US010567988B2

(12) United States Patent
Harrang et al.

(10) Patent No.: US 10,567,988 B2
(45) Date of Patent: Feb. 18, 2020

(54) RADIO ACCESS TYPE DETECTION USING TRAFFIC METRICS

(71) Applicant: Opanga Networks, Inc., Seattle, WA (US)

(72) Inventors: Jeffrey Paul Harrang, Seattle, WA (US); John Burnette, Seattle, WA (US); David Gibbons, Seattle, WA (US); David Ryan, Bothell, WA (US); Benjamin Hadorn, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 0 days.

(21) Appl. No.: 15/613,000

(22) Filed: Jun. 2, 2017

(65) Prior Publication Data

US 2017/0353874 A1    Dec. 7, 2017

Related U.S. Application Data

(60) Provisional application No. 62/345,531, filed on Jun. 3, 2016, provisional application No. 62/462,747, filed on Feb. 23, 2017.

(51) Int. Cl.
| | |
|---|---|
| *H04W 24/08* | (2009.01) |
| *H04L 12/26* | (2006.01) |
| *H04W 24/10* | (2009.01) |
| *H04W 36/14* | (2009.01) |

(52) U.S. Cl.
CPC ......... *H04W 24/08* (2013.01); *H04L 43/0864* (2013.01); *H04W 24/10* (2013.01); *H04W 36/14* (2013.01)

(58) Field of Classification Search
CPC ..... H04W 24/08; H04W 36/14; H04W 24/10; H04W 36/26; H04W 36/22; H04L 43/0864; H04L 41/5067; H04L 29/12339
See application file for complete search history.

(56) References Cited

U.S. PATENT DOCUMENTS

| 6,446,121 B1 * | 9/2002 | Shah .................... H04L 41/5009 709/203 |
| 8,107,438 B1 * | 1/2012 | Singh .................... H04W 36/30 370/332 |
| 2010/0322252 A1 * | 12/2010 | Suganthi ........... H04L 29/12339 370/395.53 |
| 2012/0311126 A1 * | 12/2012 | Jadallah .............. H04L 41/5067 709/224 |
| 2014/0040353 A1 | 2/2014 | Sebastian et al. |
| 2014/0113630 A1 * | 4/2014 | Vangala ................ H04W 36/26 455/436 |
| 2014/0237118 A1 | 8/2014 | Matthews |

(Continued)

OTHER PUBLICATIONS

International Search Report and Written Opinion for PCT/US2017/035832 dated Sep. 13, 2017.

*Primary Examiner* — Vinncelas Louis

(57) ABSTRACT

A method includes detecting a data flow between a user equipment in a radio access network (RAN) and a content provider, measuring a delivery performance between the user equipment and a transport manager by inspecting a plurality of data packets in the data flow, and inferring control information associated with the data flow using the measured delivery performance. The transport manager is connected between the RAN and the content provider.

20 Claims, 12 Drawing Sheets

(56) References Cited

U.S. PATENT DOCUMENTS

| | | | |
|---|---|---|---|
| 2014/0269319 A1 | 9/2014 | Decusatis et al. | |
| 2015/0142910 A1* | 5/2015 | Harrang | G06F 16/00 709/213 |
| 2015/0172985 A1* | 6/2015 | Gangadhar | H04W 36/22 370/332 |
| 2016/0294681 A1* | 10/2016 | Khakpour | H04L 45/306 |
| 2016/0380860 A1* | 12/2016 | Singhal | H04L 43/0864 709/224 |

* cited by examiner

RADIO ACCESS TYPE DETECTION USING TRAFFIC METRICS

CROSS-REFERENCES TO RELATED APPLICATIONS

This application claims priority to U.S. Provisional Application No. 62/345,531, filed on Jun. 3, 2016 and entitled RADIO ACCESS TYPE DETECTION USING TRAFFIC METRICS, and to U.S. Provisional Application No. 62/462,747, filed on Feb. 23, 2017 and entitled RADIO ACCESS TYPE DETECTION USING TRAFFIC METRICS, which are hereby incorporated by reference in their entirety.

BACKGROUND

Management or optimization of network user data packet traffic is often conducted at locations where traffic is directed through equipment that can inspect and process traffic flows and take appropriate actions. In mobile network architectures, management equipment may be located at the border between the mobile data access network and one or more external wide-area data networks (e.g., the Internet).

In order to manage user data traffic, the management equipment typically needs to distinguish or classify data packets in a traffic flow. For example, the equipment may need to determine which data packets in the traffic flow are being transferred to/from a user equipment terminal operating on the mobile network. In further examples, the equipment may need to determine a specific data application type operating on the user equipment terminal, or any other similar classification.

In addition, it may be useful to determine control information about the user equipment terminal in the mobile network architecture. The control information may provide relevant details for management and/or adjustment of the mobile network. The term "control information" may refer to information such as network attachment information, and/or radio link quality information.

The network attachment information provides relevant details about a current status of the mobile network. For example, the network attachment information may include information such as a type of serving radio access network (RAN) in the mobile network architecture, characteristics of the serving network, a serving base station ID, a serving base station cell ID, etc. The network attachment information may be useful for controlling the operation of the management equipment, for example.

However, the data packets in the traffic flow, themselves, do not carry readable control information. For example, neither data packet headers, payloads in the data packets, nor any other parts of the data packets that could be inspected by the management equipment, carry network attachment information details. Thus, the management equipment cannot rely on the content of the data packets to determine the control information. Without the control information, the management equipment has difficulty identifying the type of access network of the data flow, access network characteristics of the data flow, or where a particular user equipment terminal in the data flow is operating, for example. Similarly, the management equipment would have difficulty detecting changes in network attachment information such as handover from one serving network to another.

Additionally, it may be beneficial to determine the control information outside of equipment within a RAN of the data flow. For example, the management equipment may measure or estimate the quality of a radio link connecting equipment of individual users to a serving base station. Radio link quality measurements are typically carried out by equipment within the Radio Access Network (RAN) including the actual base station equipment, or the user radio (e.g. smartphone), or by both. The ability to accurately infer radio link quality metrics based on data transmission characteristics can be useful for applications such as data-plane packet delivery optimization and, in such cases, it is advantageous to be able to make such inferences without having to rely on receiving metrics from the RAN equipment. The ability for management equipment located outside of the RAN equipment to infer radio link quality without relying on RAN equipment supports autonomous data-plane determination of individual link quality and may be applied for example to cases where integration with RAN equipment metrics is not practical, or in cases where RAN equipment does not provide such radio link quality metrics, such as in the cases of small-cell and ad-hoc Wi-Fi networks.

It would therefore be beneficial for traffic management equipment to determine control information associated with a traffic flow when the management equipment receives data packets in the traffic flow, which do not directly contain the control information.

SUMMARY

Figure 1A:
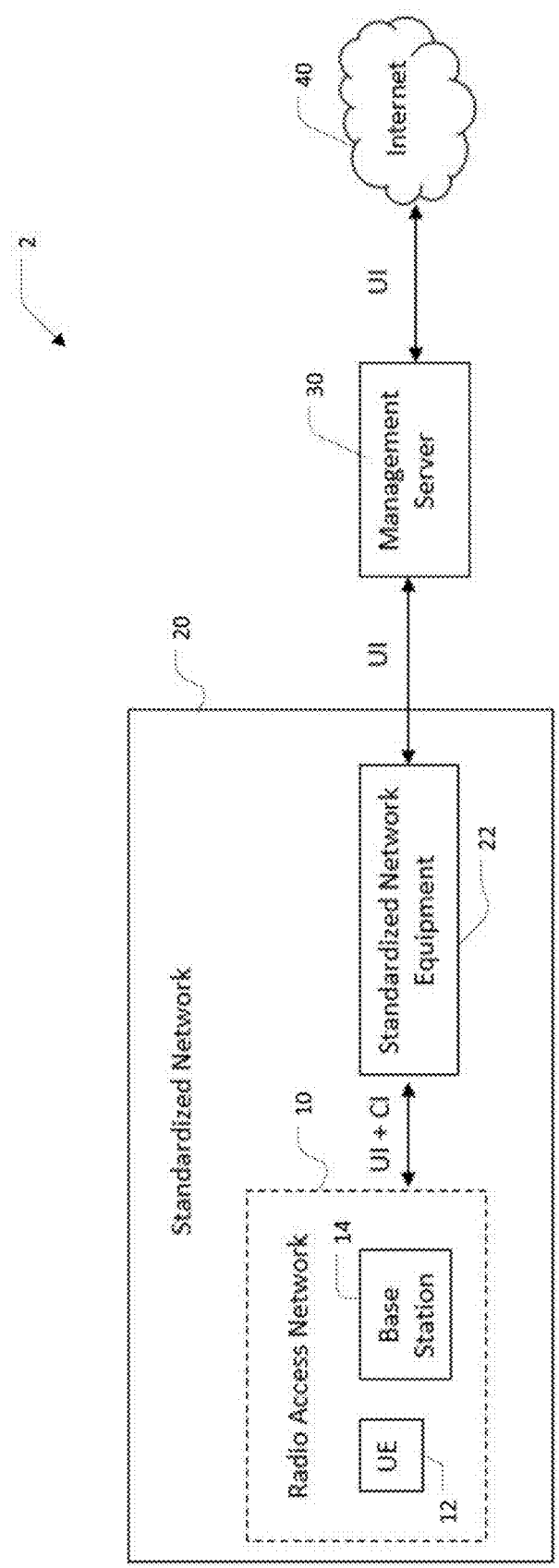
FIG. 1A illustrates a system architecture including a data flow between a user equipment (UE) and the Internet through a standardized network according to an embodiment.

A method according to an embodiment includes detecting a data flow between a user equipment in a radio access network (RAN) and a content provider; measuring a delivery performance between the user equipment and a transport manager by inspecting a plurality of data packets in the data flow, the transport manager being connected between the RAN and the content provider; and inferring control information associated with the data flow using the measured delivery performance.

Measuring the delivery performance between the transport manager and the user equipment by inspecting a plurality of data packets in the data flow may include measuring a round-trip-time (RTT) latency of the plurality of packets between the transport manager and the user equipment.

Measuring the RTT latency of the plurality of packets between the transport manager and the user equipment may include measuring a plurality of RTT latencies of the plurality of packets between the transport manager and the user equipment; and determining a best case RTT by filtering the plurality of RTT latencies.

Measuring the RTT latency of the plurality of packets between the transport manager and the user equipment may include determining a first time when the transport manager forwards a first packet from the user equipment to the content provider; determining a second time when the transport manager receives a second packet from the content provider, the second packet being forwarded to the user equipment in response to the first packet; determining a third time when the transport manager receives a third packet from the user equipment, the third packet being forwarded to the content provider in response to the second packet; and measuring the RTT latency by determining a difference between the first time and the second time or a difference between the second time and the third time.

The data flow may include a handshake between the user equipment and the content provider, the handshake including the first packet and the second packet.

Inferring the control information associated with the flow using the measured delivery performance may include determining a change in the measured delivery performance; and determining that the user equipment is handed over from a first network to a second network based on the change in the measured delivery performance.

Inferring the control information associated with the data flow using the measured delivery performance may further include determining a type of the RAN based on historical delivery performance characteristics; and predicting a future delivery performance of the data flow based on the determined type of the RAN.

The method may further include determining a coverage quality of a cell in which the user equipment is operating by comparing the control information associated with the data flow of the user equipment to control information associated with other data flows of other user equipment in the cell.

The method may further include receiving the plurality of data packets from the RAN without receiving the control information from the RAN.

The method may further include applying a management function to the data flow based on the control information.

A system, according to an embodiment, includes one or more processors; and a non-transitory computer readable medium comprising computer executable instructions which, when executed by the one or more processors, causes the system to: detect a data flow between a user equipment in a radio access network (RAN) and a wide-area data network; measure a delivery performance between the user equipment and a transport manager by inspecting a plurality of data packets in the data flow, the transport manager being connected between the RAN and the content provider; and infer control information associated with the data flow using the measured delivery performance.

The computer executable instructions which, when executed by the one or more processors, may cause the system to measure the delivery performance between the transport manager and the user equipment by inspecting a plurality of data packets in the data flow comprises measuring a round-trip-time (RTT) latency of the plurality of packets between the transport manager and the user equipment.

The computer executable instructions which, when executed by the one or more processors, may cause the system to measure the RTT latency of the plurality of packets between the transport manager and the user equipment by: measuring a plurality of RTT latencies of the plurality of packets between the transport manager and the user equipment; and determining a best case RTT latency by filtering the plurality of RTT latencies.

The computer executable instructions which, when executed by the one or more processors, may cause the system to measure the RTT latency of the plurality of packets between the transport manager and the user equipment by: determining a first time when the transport manager forwards a first packet from the user equipment to the content provider; determining a second time when the transport manager receives a second packet from the content provider, the second packet being forwarded to the user equipment in response to the first packet; and measuring the RTT latency by determining a difference between the first time and the second time, and wherein the data flow includes a handshake between the user equipment and the content provider, the handshake including the first packet and the second packet.

The computer executable instructions which, when executed by the one or more processors, may cause the system to infer the control information associated with the flow using the measured delivery performance by: determining a change in the measured delivery performance; and determining that the user equipment is handed over from a first network to a second network based on the change in the measured delivery performance.

The computer executable instructions which, when executed by the one or more processors, may cause the system to infer the control information associated with the data flow using the measured delivery performance by: determining a type of the RAN based on historical delivery performance characteristics; and predicting a future delivery performance of the data flow based on the determined type of the RAN.

The computer executable instructions which, when executed by the one or more processors, may further cause the system to apply a management function to the data flow based on the control information.

A non-transitory computer-readable storage medium, according to an embodiment, whose contents, when executed by a computer, cause a computer to perform operations comprising: identifying a data flow between a user equipment in a radio access network (RAN) and a content provider; measuring a plurality of round-trip-time (RTT) latencies between the user equipment and a transport manager of a plurality of packets in the data flow, the transport manager being connected between the RAN and the content provider; and inferring control information associated with the data flow using the plurality of RTT latencies.

The control information may include network attachment information, radio link quality information, or both.

Inferring control information associated with the data flow using the plurality of RTT latencies may include determining a type of the RAN based on historical delivery performance characteristics; and predicting a future delivery performance of the data flow based on the determined type of the RAN.

DETAILED DESCRIPTION

Embodiments of the present disclosure relate to systems, methods, and apparatuses for inferring control information about a data flow between a user equipment (UE) and a wide-area data network, such as the Internet. The wide-area data network may include a content provider, e.g., a content server, that transmits data packets to the UE. In an embodiment, the UE is a handset device or mobile device.

In an embodiment, the control information provides information about a network through which the data flow passes, or about the data flow itself, which can be utilized to apply and/or adjust traffic management policies associated with the data flow. For example, the control information may include network attachment information, radio link quality, or both. In a specific embodiment, the control information provides a type of network (e.g., a 3G network, 4G LTE, LTE-A, LTE-U, 5G network, etc.) used to transmit data packets in the data flow from the UE and the wide-area data network.

Particular embodiments include a transport manager that can derive the control information from data packets in the data flow that do not directly include the control information. For example, the transport manager may be part of a management server located outside of a radio access network (RAN) and/or a standardized network including the UE, and may access data packets in the data flow. Although the control information may be exchanged within the RAN and/or the standardized network, the transport manager may not receive a readable form of the control information in the data packets of the data flow.

In an embodiment, the control information is inferred by measuring a delivery performance of the data flow. For example, the transport manager may determine a delivery performance of the data flow by measuring a round-trip-time (RTT) of data packets between the UE and the transport manager. For example, whether the data flow is running over a 3G network, a 4G network, or a different type of network.

In an embodiment, the control information is used to manage or process data flow between network elements. For example, the control information may be used to determine whether the UE has been handed off to a new mobile network, to predict a future delivery performance of the data flow, and other features specific to the data flow. The control information for the data flow can also be compared to the performance metrics associated with other data flows with similar control information, in order to diagnose issues associated with equipment in the RAN, such as issues associated with the UE or the serving base station. For example, when the management server identifies that a specific data flow is on a 3G network, the management server can compare the delivery performance of the specific data flow with delivery performances of other data flows associated with the same 3G network and the same serving base station. Based on the comparison, the management server can diagnose specific issues associated with the specific data flow or the similar data flows, for example, whether the UE is located in a poor coverage area or whether the serving base station needs to be replaced.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Embodiments of the present disclosure provide a system and method for determining and reacting to control information about a traffic flow associated with a user equipment. In an embodiment, the control information is determined using the delivery performance of data traffic associated with the UE. The control information may include network attachment information, radio link quality, or both. The control information can be derived from data delivery characteristics of the data flow associated with the user equipment and/or other data traffic associated with other user equipment.

Control information, as understood in some embodiments, may include network attachment information, such as the type of serving network (e.g., GSM, UMTS, LTE, WiFi, etc.) of the data flow, characteristics of the serving network (e.g., peak data throughput, aggregate traffic capacity, supported data services, etc., channel quality such as Channel Quality Indicator (CQI), highest supported airlink modulation and coding mode, airlink packet retry rate, etc.), location of the serving network (e.g. base station ID, cell ID, etc.), and service information (e.g. operator ID, customer data plan type, supported services, etc.) of the UE. Control information may also be referred to as "network attachment information" or "radio link quality information."

Delivery performance, as understood in some embodiments, may include one or more of data packet latency, latency variation, data throughput, data throughput variation, data 'goodput' (net useful user data throughput excluding overhead), packet loss, packet resends, delivered data volume, packet payload size, or similar performance metrics. In an embodiment, delivery is bidirectional in nature and includes delivery to a user terminal, delivery from a user terminal, or both.

FIG. 1A illustrates a system architecture 2 including a data flow between a user equipment (UE) 12 and the Internet 40 through a standardized network according to an embodiment.

The system includes a radio access network (RAN), a standardized network, a management server, and the Internet 40.

The RAN may include the UE 12 and a base station 14. Although only one UE 12 is pictured, the RAN may include a plurality of UEs, which may be connected to the same base station 14 and may be associated with respective data flows. The UEs may also connect to a plurality of base stations.

The UE 12 may transmit and receive data packets from the Internet 40 via a data flow. The data flow may include a plurality of data packets that may be exchanged bidirectionally between the UE 12 and the Internet 40. The UE 12 may transmit and receive the data packets from the Internet 40 through the base station 14, the standardized network equipment 22, and the management server 30.

The data packets may include first data packets including user data information (UI) and/or control information (CI), and second data packets including UI without CI. The UI may include requests from the UE for data, data requested by the UE, and/or data sent by the UE. The CI may include information for managing the data flow in the standardized network 20. For example, the first data packets that include the CI may include readable network attachment information and/or readable radio link quality information about the data flow.

The RAN may exchange the first packets containing the UI and the CI with standardized network equipment 22 in the standardized network 20. The standardized network equipment 22 may use the CI to facilitate control operations in the standardized network 20.

The standardized network equipment 22 may transmit and receive the second data packets including the UI without the CI with the Internet 40 through a management server 30 outside of the standardized network 20. The standardized network 22 may, for example, forward the UI from the first packets without including the CI in the second packets, or obfuscate the CI in the second packets. Accordingly, neither the management server 30 nor the Internet 40 may receive the CI in a readable form from the data packets in the data flow.

The standardized network equipment 22 may include equipment in the standardized network 20 that is specified by a network standard. For example, the standardized network equipment 22 may include standard equipment in the core of a standardized network, e.g., an LTE or 3G network.

The management server 30 may access the second packets exchanged between the standardized network equipment 22 and the Internet. The management server 30 may exert control over the standardized network 20 based on CI of the data flow, which may be readable or derived. The management server 30 may be part of the core of the standardized network 20, or may be outside of the core.

Although the management server 30 may not receive the CI from the standardized network equipment 22, the management server 30 can derive the CI from the data flow. For example, the management server 30 may include a transport manager that is capable of deriving the CI. In addition, the management server 30 may include a flow detector that may identify the data flow as a relatively burdensome data flow, and may selectively forward the data flow to the transport manager when the data flow is identified as a relatively burdensome data flow.

Figure 1B:
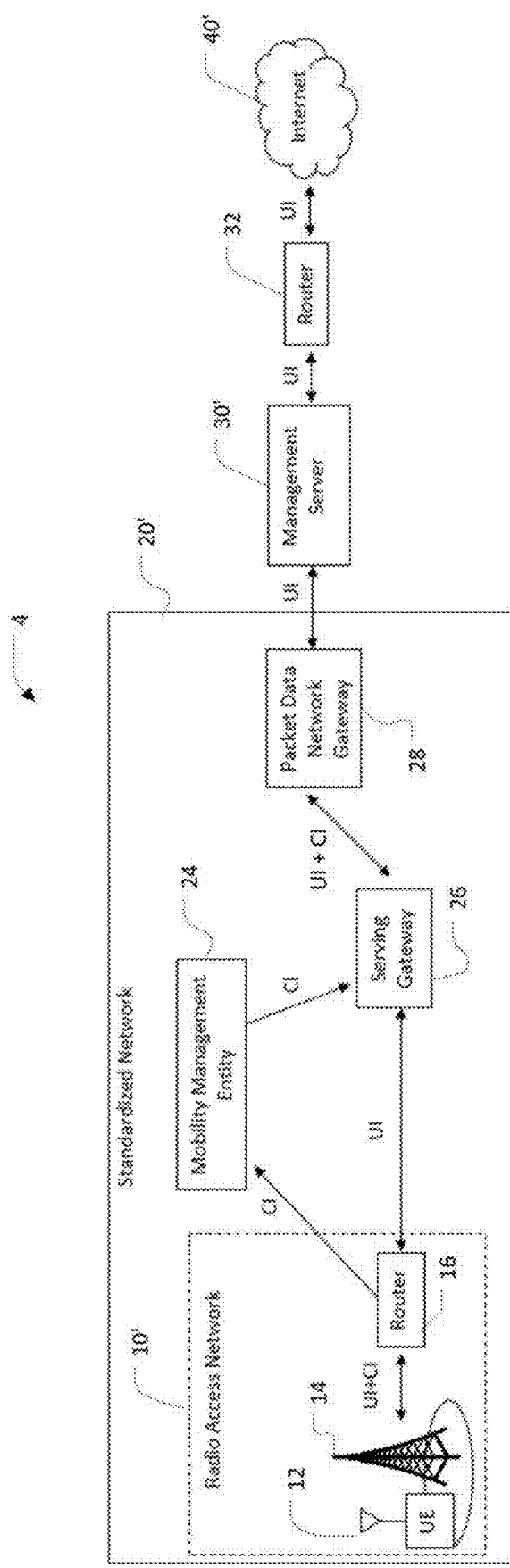
FIG. 1B illustrates a system architecture including a data flow between a UE and the Internet through an LTE network according to an embodiment.

FIG. 1B illustrates a system architecture 4 including a data flow between a UE and the Internet through an LTE network according to an embodiment.

A RAN 10' illustrated in FIG. 1B includes a router 16. The router 16 may exchange UI and CI with a base station 14', and may transmit the UI and CI separately.

In an embodiment, a standardized network 20' is an LTE network, and includes a mobility management entity (MME) 24, a serving gateway (SGW) 26, and a packet data network gateway (PGW) 28. The MME 24, the SGW 26, and the PGW 28 may be part of the standardized network equipment 22 illustrated in FIG. 1A. The MME 24 receives the CI from the router 16, and may transmit the CI to the SGW 26. The SGW 26 may receive the UI from the router 16, and exchange the UI with the PGW 28. The PGW 28 may exchange packets containing the UI without the CI with a management server 30'.

The management server 30' may exchange data packets including the UI with an Internet 40' via a router 32. The management server 30' may be part of the core of the LTE network, or may be outside of the core.

Figure 2A:
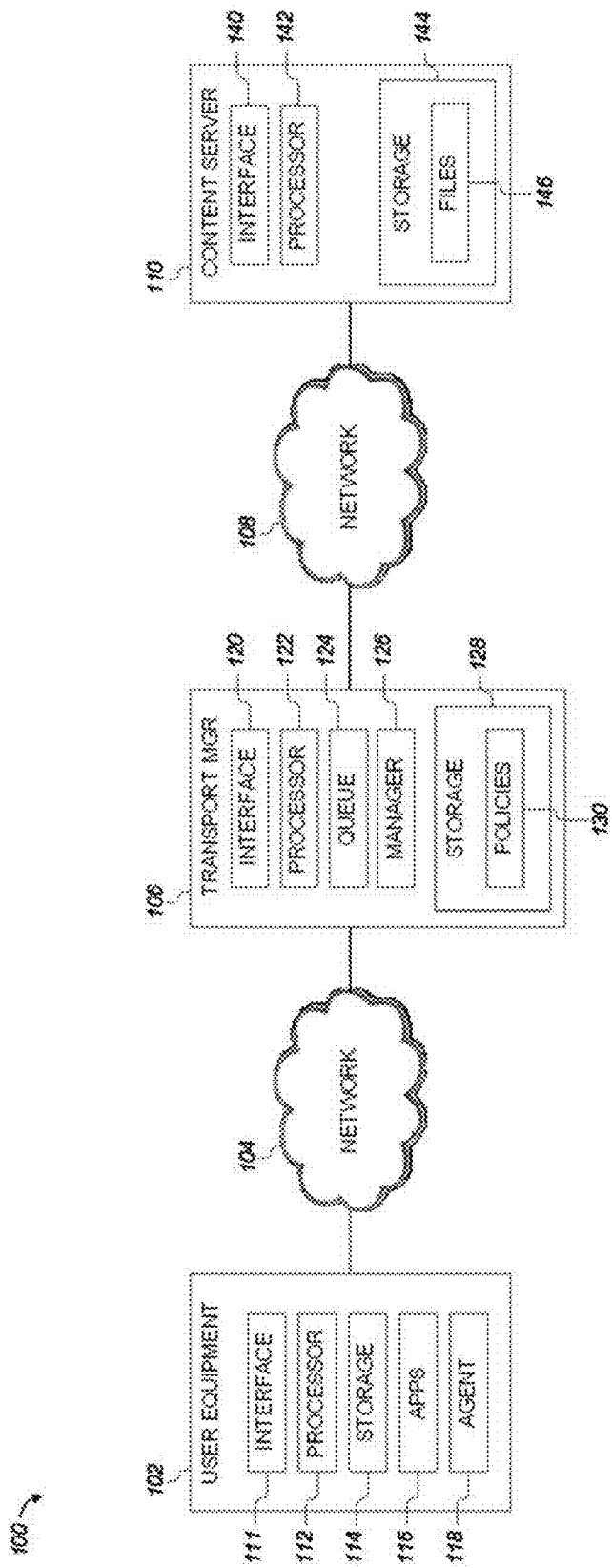
FIG. 2A illustrates a system architecture according to an embodiment.

FIG. 2A illustrates a system architecture 100 according to an embodiment. The system architecture 100 may include one or more user equipment terminals 102, one or more transport managers 106, and one or more content servers 110. Packet data networks 104 and 108 may interconnect the one or more user equipment terminals 102, the one or more transport managers 106, and the one or more content servers 110. The packet data networks 104 and 108 may be two distinct networks or part of a single large functional network.

In some embodiments, the network 104 connecting the transport manager 106 to the user equipment 102 is an access network (AN), for example, a mobile cellular access network (e.g., 2G, 3G, LTE, 5G), but may be another type of network in other embodiments. The AN may include a core collection of sub-nodes linking to a radio access network (RAN). In an embodiment, the AN may be a standardized network including standardized network equipment.

In some embodiments, the network 108 connecting the Content Servers 110 and the Transport Manger 106 may be a wide-area network (WAN). For example, the WAN may be the Internet.

In the system architectures of some embodiments of the present disclosure, it is assumed that at least a selected portion of the packet data traffic between the user equipment terminals 102 and the content servers 110 passes through or is in-line with the transport manager 106.

For that reason, in an embodiment, a convenient physical location for the transport manager 106, or a management server including the transport manager 106, is at the border traffic aggregation point(s) connecting the AN 104 with the WAN 108. For example, in a 3GPP standard mobile network this aggregate point may be part of the SGi-LAN connecting to the PDN-Gateway core element (or alternately the Gi-LAN and GGSN-Gateway) and outwards to the Internet. However, in other embodiments the transport manager 106 may be located elsewhere. In some alternate embodiments the transport manager 106 may be part of a content delivery network serving one or more ANs.

In other alternate embodiments the transport manager 106 may be located at any node or endpoint between (or including) the user equipment 102 and the content server 110. In an embodiment, the transport manager 106 is located at any of a base station, a gateway, or an access point serving the user equipment 102 node.

Figure 2B:
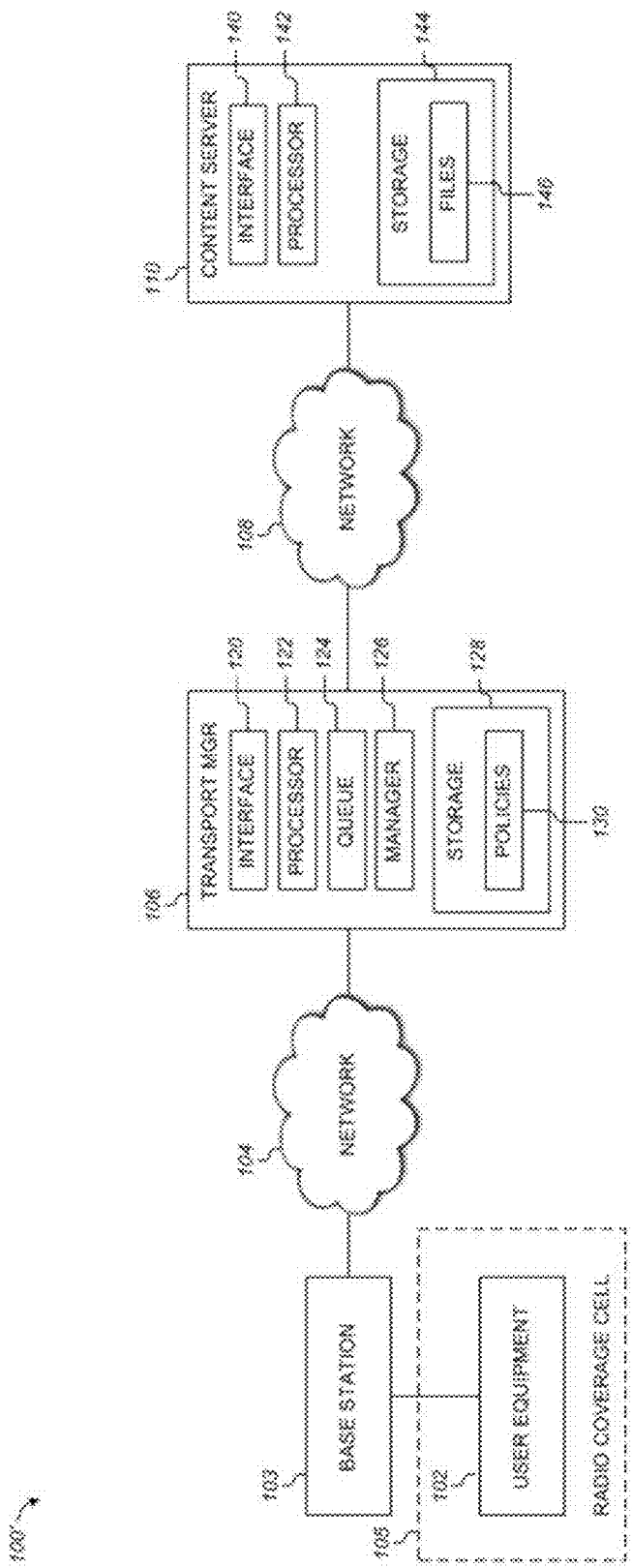
FIG. 2B shows a system architecture including a base station according to an embodiment.

FIG. 2B shows an example of a system architecture 100' including a base station 103 according to an embodiment.

In some embodiments, the network 104 connecting the transport manager 106 and user equipment 102 may be consistent with the system architecture 100' shown in FIG. 2B.

In the example of the system architecture 100' shown in FIG. 2B, the base station 103 provides radio link connectivity to a plurality of user equipment devices, including the user equipment 102. The base station may be a NodeB, eNB, etc. The base station 103, together with a plurality of user equipment devices including the user equipment 102, together form a radio access network (RAN). The base station 103 may provide one or more radio link connectivity areas known as "cells" 105 for the plurality of user equipment devices including the user equipment 102, which share the radio link resources of the cell. In an embodiment, an access point may be used in place of the base stations 103. Although only one base station 103 is illustrated in FIG. 2B, the system architecture 100' may further include one or more additional base stations connected between the network 104 and respective user equipment devices.

In the embodiment shown in FIG. 2B, a user equipment radio link provided by the base station 103 may include a radio frequency channel or airlink through which the user equipment 102 connects to the network 104. This radio link may have time variable attributes such as real time and average signal-to-noise ratio (S/N), supportable modulation mode and coding, channel quality indication (CQI) statistics, retry characteristics (e.g. HARQ retry behaviors) and other attributes that collectively can be described as user link channel quality.

The base station 103 may include or be connected to network equipment that may receive or transmit control information associated with data packets transmitted or received by the user equipment 103. The control information may include information for managing the data flow in the network. For example, the control information may include network attachment information, and/or radio link quality information. However, this control information may be removed or obfuscated from the data packets before the data packets are transmitted to the transport manager 106 and the WAN 108 over the network 104. Accordingly, the transport manager 106 may receive user data information in the data packets without receiving the control information. The user data information may include requests from the UE for data, and/or data requested by the UE.

Figure 2C:
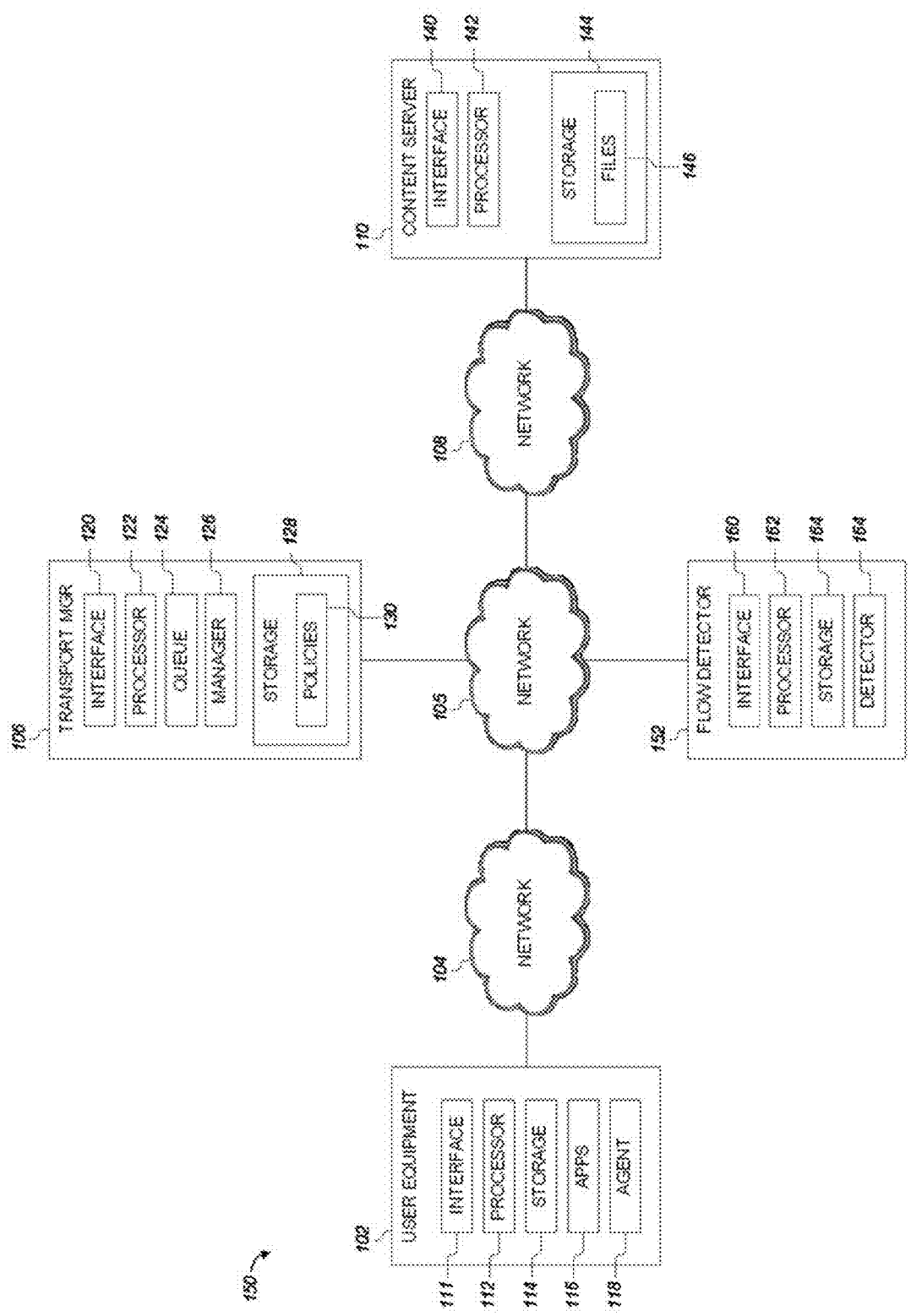
FIG. 2C shows a system architecture including a flow detector element according to an embodiment.

FIG. 2C shows an example of system architecture 150 including a flow detector 152 element according to an embodiment. A network 105 may facilitate communication between the transport manager 106 and the flow detector 152. Traffic between the user equipment 102 and the content server 110 may traverse the network 105 in addition to networks 104 and 108.

The flow detector illustrated in FIG. 1C may monitor or sample data traffic traversing networks 104 and 108, which are described above. The flow detector 152 may identify flows for further processing based on configured policies or templates characterizing the flows. The flow detector 152 may include a detector 164, which is a functional sub-element that measures the average throughput, delivered data volume, duration, and other characteristics of a flow.

The characteristics of the data flow measured by the flow detector 164 may be used to classify the flow as relatively burdensome in its use of network resources including shared throughput capacity. For example, the flow detector 152 may classify a flow as an "elephant flow" when the flow has characteristics over a predetermined threshold, e.g., a greater delivered data volume than a predetermined threshold data volume. Packets belonging to these elephant flows (or other flow types) may in some embodiments be distinguished by their component packet network and transport layer headers including, for example, combinations of the IP source and destination addresses, the TCP (or UDP) source and destination port, the protocol (IPv4), the flow label (IPv6), flags, extension header fields, etc.

In some scenarios, e.g., when the network or transport layer packet data payloads may be encrypted or obfuscated, the payload header may be the primary means of identifying packets belonging to a flow. In other scenarios where the packet data payloads are readable, the information in the network or transport packet payloads may be used to further help distinguish packets associated with a flow.

In some embodiment, once the flow detector 152 has identified an elephant flow, the flow detector 152 may trigger reconfiguration of the packet forwarding logic in the network 105, so that the packets in the elephant flow traversing that network 105 are directed to include the transport manager 106 in the end to end path between the server 110 and the user equipment 102. For example, the flow detector 152 may communicate a selected flow's characteristics to one or more routers and switches comprising the network 105, so that dynamically configured forwarding or switching rules associated with the network 105 may cause subsequent packets in the selected flow to include the transport manager 106 in the end-to-end path of the packets using principles of Software Defined Networking. In an embodiment, the transport manager 106 is included in the end-to-end path according to default rules, and the flow detector 152 informs the transport manager of detected flows that match one or more classification templates, so that the transport manager may forward other traffic without processing.

The data flow may be unidirectional (e.g., uplink or downlink), or may bidirectional and include unidirectional flows in opposite directions (, which may belong to a communicating pair of connection endpoints. For example, the data flow may include packets with any of interchanged destination source network addresses, interchanged port addresses, common flow labels. In some embodiments, both directions of a bidirectional flow pair of data packets are directed to the transport manager 106.

The flow detector 152 and the transport manager 106 may be distinct functional elements as shown, or may be combined into a single functional unit. For example, the flow detector 152 and the transport manager 106 may be integrated into a management server.

In some embodiments, the network 105 facilitating communication between the flow detector 152 and the transport manager 106 may be a local area network or data center for example a SGi or Gi-LAN located at the border of a mobile network. However, in other embodiments, the network 105, the flow detector 152, and the transport manager 106 may be located elsewhere. In some embodiments, the flow detector 152 and the transport manager 106 may be located in a content delivery network serving one or more ANs. In other embodiments, the flow detector 152 and the transport manager 106 may be located at any node or endpoint between (or including) end nodes that exchange traffic, e.g., the user equipment 102 and the server 110. In an embodiment of the present disclosure, the flow detector 152 and the transport manager 106 are located at the base station 103 of FIG. 1B, or at a gateway or access point serving one or more nodes including the user equipment 102.

In some embodiments, the transport manager 106 detects, measures, and modulates data flows that pass through the transport manager 106 between flow connection endpoints, such as the content server 110 and the user equipment 102.

The transport manager 106 may receive data packets in the data flow that include user data information without including readable control information. The transport manager 106 may derive the control information by measuring characteristics of the data flow including the data packets.

Figure 3:
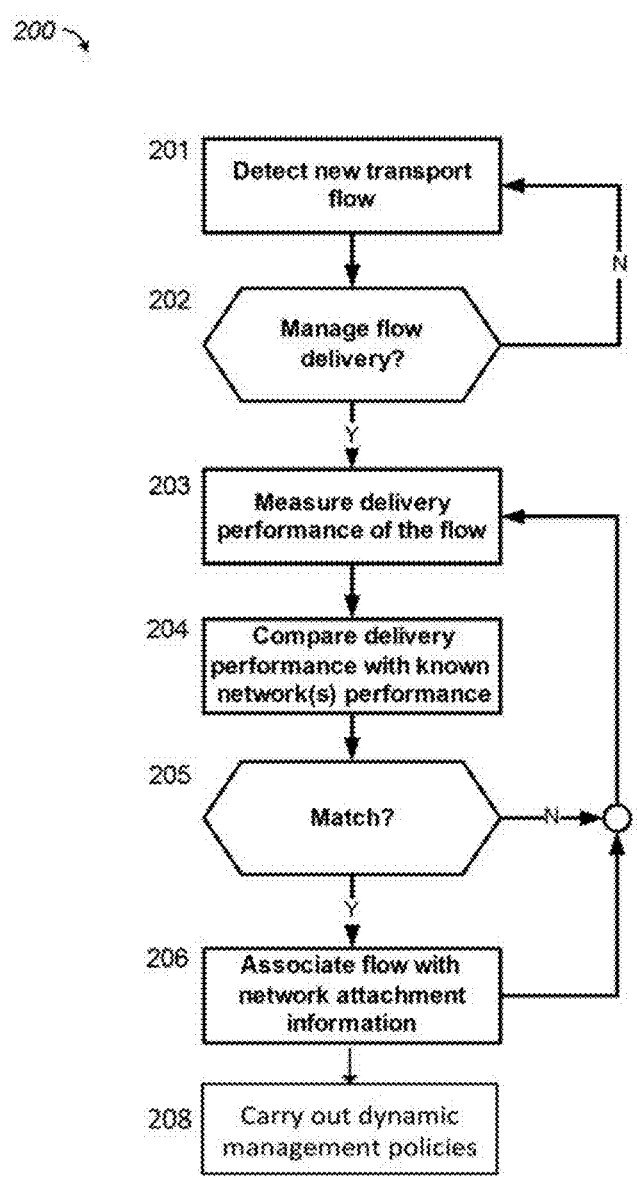
FIG. 3 illustrates a flow diagram showing functions performed by a transport manager according to an embodiment.

FIG. 3 is a flow diagram illustrating a process 200 performed by a management server according to an embodiment. The management server may include a flow detector and a transport manager.

At step 201, the management server may detect a data flow. For example, the management server monitors the network layer (e.g., an IP layer), and detects transport layer flows (e.g., TCP and/or UDP layer flows) that pass through the network layer. In a specific embodiment, the network layer may include a connection with a TCP/IP protocol 4-tuple (SA, DA, SP, DP). The management server may use the TCP/IP protocol 4-tuple of the connection to detect and inspect data packets that belong to a TCP/IP flow (e.g., a TCP/IP bidirectional flow pair) between endpoints. The TCP/IP flow may be associated with a user equipment terminal.

In some embodiments, the transport manager also monitors the data flow by inspecting higher layers, such as an HTTP layer or an application layer.

In step 202, the management server may select certain flows for closer monitoring. For example, the flow manager may select flows that the flow manager identifies as elephant flows, and selectively forward the selected flows to the transport manager.

Proceeding to step 203, the management server measures the delivery performance of the selected flow. For example, the transport manager measures the delivery performance of the selected flow.

For example, assuming a TCP/IP configuration, on TCP connection 3-way establishment, the endpoints' protocol handshake may cause the transport manager to measure and record the round-trip-time (RTT) latency between the management server and the user equipment. The RTT latency is one example of the delivery performance, but the transport manager can also use other metrics to define the delivery performance.

In an embodiment, the RTT latency between the management server and the user equipment may be determined by measuring the difference between a first time, when the management server forwards a packet with a TCP packet header having a SYN flag (e.g., a packet sent from the user equipment to the content server), and a second time, when the management server receives a corresponding server packet having a SYN-ACK flag (e.g., a packet sent from the server to the user equipment). In another embodiment, the RTT latency is a time period between when the packet having the SYN-ACK flag leaves the management server and when a corresponding a packet having an ACK flag is received by the management server from the user equipment for forwarding to the content server.

The management server may use its own internal clock alone or in combination with sender and/or receiver TCP timestamps (RFC-1323) to determine the RTT latency between the management server and the user equipment.

In an embodiment, the management server may measure and record the RTT latency between the management server and the user equipment for previously established flow data packet pairs. For example, the transport manager can record the RTT latency by inspecting the TCP headers of sent and acknowledged packets passing through the transport manager. For example, the transport manager can measure the RTT latency of a data flow between the user equipment and the content server based on a completed flow setup handshake between the user equipment and the content server.

In an embodiment, the management server measures the RTT latency by determining the time period between a time point when the management server forwards a transport flow packet, and a time point when the management server receives the acknowledgement for the associated TCP/IP 4-tuple return flow using the SEQ and ACK numbers in the TCP packet headers.

At step 204, the management server may compare the measured delivery performance of the data flow with one or more known network delivery performances. For example, the management server may compare the measured RTT latency to a plurality of known, best-case RTT latency values, each associated with a set of predetermined network conditions. The one or more known network delivery performances may be associated with, e.g., a delivery performance associated with an LTE network, a delivery performance associated with a 3G network, etc.

At step 205, the management server may determine whether the measured delivery performance matches the known network delivery performance. If the delivery performances do not match, the management server proceeds back to step 203, and once again measures the delivery performance of the data flow. If the delivery performances match, the management server proceeds to step 206.

At step 206, after the management server associates the data flow with specific control information based on the matching known network delivery performance. The control information may be network attachment information. For example, if the management server determines that the measured RTT latency of the data flow matches a known RTT latency of an LTE network, the management server may identify the data flow as utilizing an LTE network.

After step 206 is completed, the management server may proceed back to step 203. The management server may measure the delivery performance of the data flow multiple times, for example, periodically. Accordingly, the management server can detect changes in the delivery performance characteristics of a traffic flow between the user equipment and the server.

The detected changes in the delivery performance characteristics of the data flow may indicate the user equipment has been handed over from one access network type to another access network type. For example, if the management server determines that a measured RTT latency value is different than a previously measured RTT latency value, the management server may identify that the user equipment has been handed over from one network type to another network type.

At step 208, the transport manager may further apply a management function or policy to the data flow based on the control information. Dynamic management policies may be implemented based on the identified control information. For example, the transport manager may adapt the delivery of data flows using various mechanisms, including rate limiting or buffering, based on the identified control information. In one example, the transport manager may use inferred control information to determine that a data flow is traversing a 3G network. The transport manager may update its model for expected traffic behavior such that the data flow delivery may be modulated to avoid other cross-traffic data flows. In another example, the transport manager may determine that the network type as changed (e.g., to an LTE network) and further update its expected traffic behavior model, thus changing the delivery modulation.

In an embodiment, the RTT latency measured by the management server may be inaccurate. For example, the content server may transmit an RFC-1122-type TCP Delayed-ACK to the management server, which may have a delay of, for example, up to 500 ms. The delay may cause the management server to overestimate the RTT latency. In another example, resource congestion in the data flow between or at the management server and the user equipment may also distort the measured RTT latency above the best-case (minimum) RTT latency for the data flow. The measured RTT latency may also be limited by the underlying network technology.

Because of effects such as Delayed-ACKs, Multiple-Segment-ACKs, congestion, and other causes, the RTT latency measured by the management server can be larger than an actual RTT latency. That is, the measured RTT latency may be inaccurate and distorted compared to the actual RTT latency.

In order to account for these effects, the measured RTT latency can be filtered in any of a number of ways to obtain the actual RTT latency, or a best-case RTT latency, of the data flow. For instance, repeated measurements of the RTT latency by the management server can be filtered to determine a true RTT latency minimum, as illustrated in the following figures.

Figure 4:
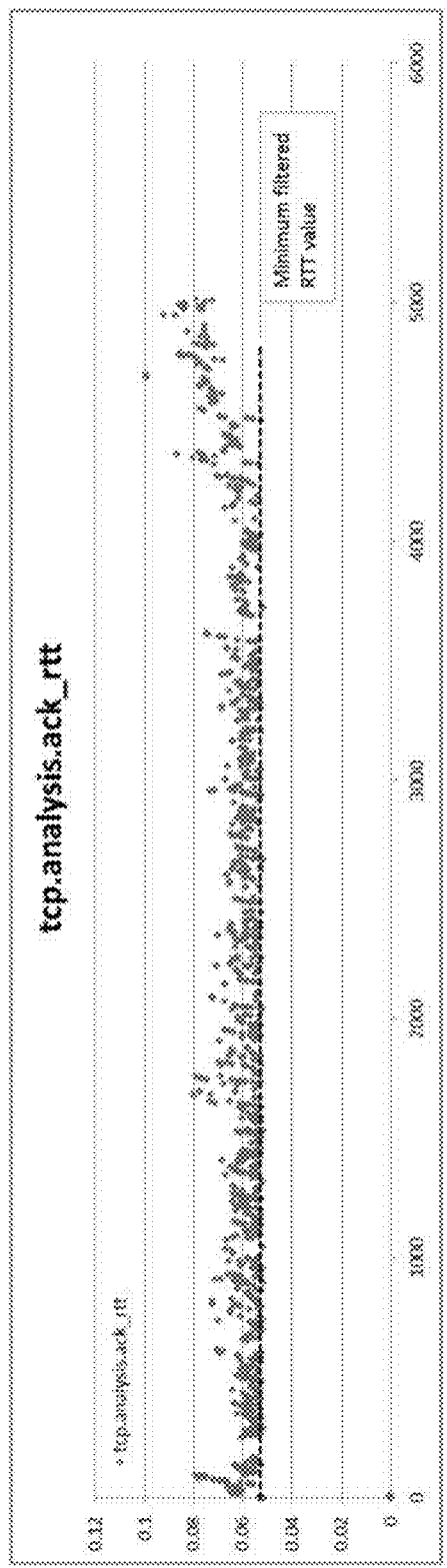
FIG. 4 illustrates a dataset of RTT measurements and a computed true RTT minimum by finding a minimum value of samples in a time window that are within an expected range according to an embodiment.

FIG. 4 illustrates a dataset of RTT latency measurements and a computed true RTT latency minimum by finding a minimum value of samples in a time window that are within an expected range according to an embodiment. FIG. 4 shows that one basic filtering strategy is to find the minimum value of RTT latency samples in a time window that are within a range defined by lower and upper boundaries of expected RTT latency values. In an embodiment, the expected RTT latency values can be predetermined, or can be derived by the management server based on measurements of historical traffic performance associated with the RAN.

Figure 5:
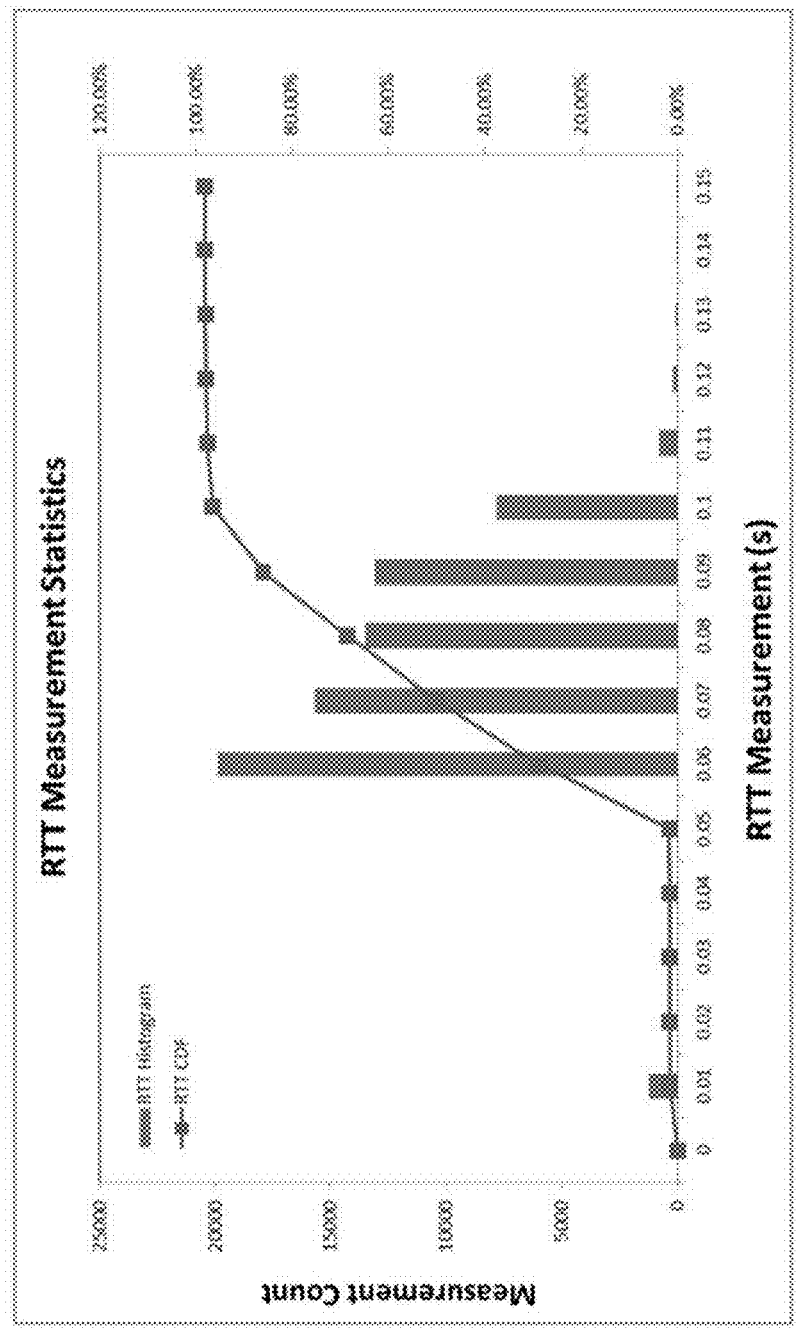
FIG. 5 illustrates a dataset of RTT measurements and a computed true RTT minimum computed by picking a lowest RTT value at a particular percentile according to an embodiment.

FIG. 5 illustrates a dataset of RTT latency measurements and a computed true RTT latency minimum computed by picking a lowest RTT latency value at a particular percentile according to an embodiment. As illustrated in FIG. 5, another strategy for calculating the best-case RTT is to compute the CDF of a plurality of measured RTT latency values and pick the lowest RTT at a particular percentile (e.g., 10%).

These filtering methods are also applicable to other sampled delivery performance metrics such as throughput, latency, latency variation (jitter), packet loss, etc., in order to obtain stable estimates of the metrics.

Figure 6:
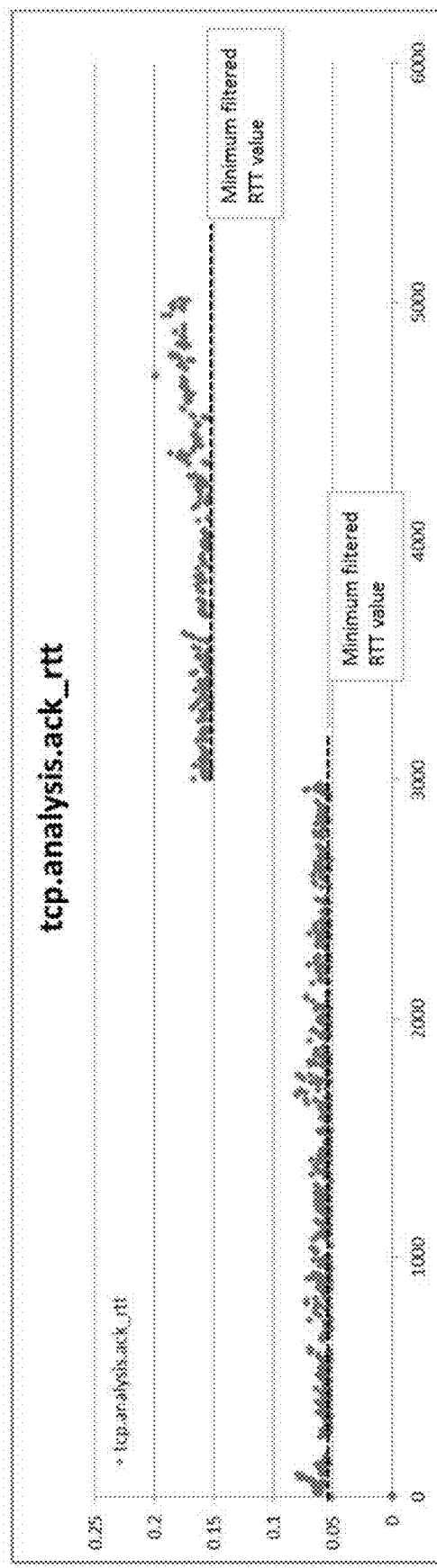
FIG. 6 illustrates a hypothetical scenario where an ongoing flow is measured during a time span when the User Equipment terminal is transferred or moves (handed over) to another radio network technology type according to an embodiment.

FIG. 6 illustrates a hypothetical scenario where RTT latency values of an ongoing data flow are measured during a time period when the user equipment terminal is handed over from one radio network technology type to another radio network technology type according to an embodiment.

The measured RTT latency values may be filtered as described above. As illustrated in FIG. 6, the measured RTT latency values jump from a relatively low minimum filtered RTT latency value to a relatively high minimum filtered RTT latency value. FIG. 6 indicates that the ongoing flow has been handed over from a radio network technology with relatively low inherent RTT latency to another radio network technology type with significantly higher inherent RTT latency (e.g., from an LTE network to a UMTS network). In the scenario illustrated in FIG. 6, the shift in the RTT latency at time point 3000 indicates the point at which the switch between networks occurs.

In an embodiment, a change in the radio network technology type may be detected algorithmically by applying detection criteria to the shift in the filtered estimates of a plurality of measured RTT latency samples. The detection criteria may be based on historical delivery performance data.

For example, the change may be detected when the shift (positive or negative) exceeds a configured threshold, for example, 0.05 s. The detection criteria may depend on historical, expected, analyzed, or measured delivery performance characteristics, such as one or more previously sampled metrics, including data packet latency, latency variation, data throughput, data throughput variation, data goodput (net useful user data throughput excluding overhead), packet loss, packet resends, delivered data volume, packet payload size, or similar performance metrics.

In some embodiments, correlations of delivery performance metric changes may be used to update the detection criteria. Accordingly, when a transfer of the user equipment to another radio network technology has been inferred by applying the detection criteria, the confidence that a detected transfer has in fact occurred may be improved. For example, a shift in filtered RTT latency samples concurrent with a shift in filtered data throughput to or from the user terminal may be monitored and used to improve the algorithm detection accuracy. In some embodiments, standard multi-variable decision logic methods including fuzzy logic, artificial neural networks, machine learning, and soft computing may be employed to further improve the accuracy of the algorithm used to detect a change in the serving radio network technology type. Measured delivery performance characteristics of a user terminal may be used as inputs to the decision logic. Decision logic may also be refined or trained by post correlating delivery performance changes with shifts in network configurations known by other means such as network operations and quality monitoring.

In other embodiments of the present disclosure, system and methods, after the delivery characteristics and possibly the classification of the network type that the user equipment terminal is attached to are determined, various response actions may be triggered.

Figure 7:
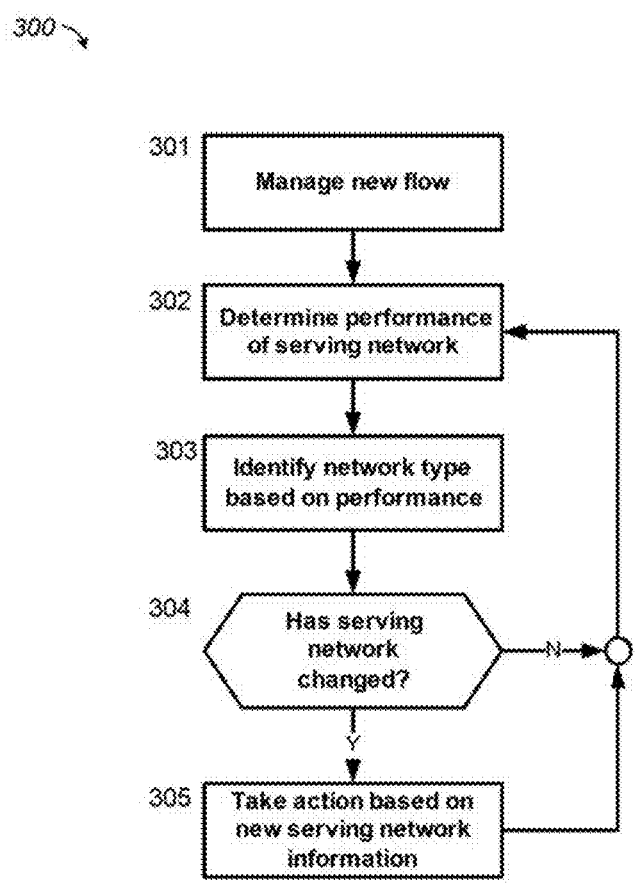
FIG. 7 illustrates an overall process flow when one or more flows transiting a transport manager are identified with a particular user equipment terminal according to an embodiment.

FIG. 7 illustrates an overall process for determining a delivery performance of one or more flows that have been identified with a particular user equipment terminal according to an embodiment.

A data flow associated with a user equipment terminal by a management server, which may include a transport manager and a flow detector, may be classified and selected for further processing beginning with step 301.

The performance of flows in a serving network is determined in step 302.

Based on the measured delivery performance determined in step 302, the management server may identify the network type serving the user terminal associated with the data flow in step 303. In some embodiments, one or more measured delivery performance characteristics are sufficient to enable identification of the serving network to a known radio network type, such as LTE, UMTS-HSPA, UMTS, EDGE, EVDO, GSM, WiFi, etc. In an embodiment, the one or more measured delivery performance characteristics includes any of a measured RTT latency value, a minimum RTT latency value, etc.

Once the serving network is identified, network performance characteristics associated with that network type may be predicted. The network performance characteristics may be predicted regardless of whether the network performance characteristics are measurable based on the flows' delivery performance. For example, a network performance characteristic of a data flow that transitions from an LTE network to a UMTS network may be predicted, because a lower speed UMTS network might be less capable of supporting high speed services such as HD video than a higher speed LTE network. In other scenarios, the measured network delivery performance may not correlate with any known network type, but can still be associated with a unique set of network performance characteristics enabling the capability to detect when the serving network type changes.

In step 304, the transport manager determines whether the serving network has changed by monitoring changes to the network performance characteristics.

The management server may then trigger actions based on the current serving network in step 305 if the management server determined that the network has changed performance characteristics in step 304. After step 305 is completed, the process loops back to step 302 to periodically re-assess the current network performance.

In some embodiments, steps 304 and/or 306 may include:

Changing flow management configurations of algorithms, processes based on the serving network; and/or Changing flow detection configurations of algorithms, processes based on the serving network.

Changing flow management configurations may, for example, include resetting a profiled link peak throughput estimate associated with a flow or user equipment endpoint of the flow. For example, methods of congestion detection that rely on a stable estimate of the uncongested (peak) throughput of the flow over a shared bottleneck network link or links may include keeping a learned history of the link peak based on past samples of a flow's throughput. If a user terminal and associated flow moves to a new serving network type, then the old link peak estimated may no longer be accurate. Resetting the link peak to allow re-learning of the new link peak may be more accurate and faster than gradually averaging out older samples.

Another example may be to set the initial link peak value (after resetting the link peak) to a value consistent with the known performance of a new serving network type (e.g., an LTE network from a UMTS network) to accelerate the link peak throughput learning process.

Changing flow detection examples may include adjusting the threshold criteria of elephant flows (which are relatively high throughput, persistent flows) in proportion to the network throughput capability. In some embodiments, an elephant flow is characterized in part by a flow that exceeds a threshold throughput level. For example, a threshold throughput level may be defined at a relatively high level (e.g., 5 Mbps) for a faster network (e.g., an LTE network), whereas and may be defined at a relatively low level (e.g., 1 Mbps) for a slower network (e.g., a UMTS network). The goal of adjusting the criteria, in some embodiments, is to detect, monitor, and manage only those flows that are relatively burdensome to the network compared to shorter, less bandwidth demanding flows sharing the network capacity. In an embodiment, a flow detector may identify elephant flows, and forward the elephant flows to a transport manager. The transport manager may monitor and manage the elephant flows.

Figure 8:
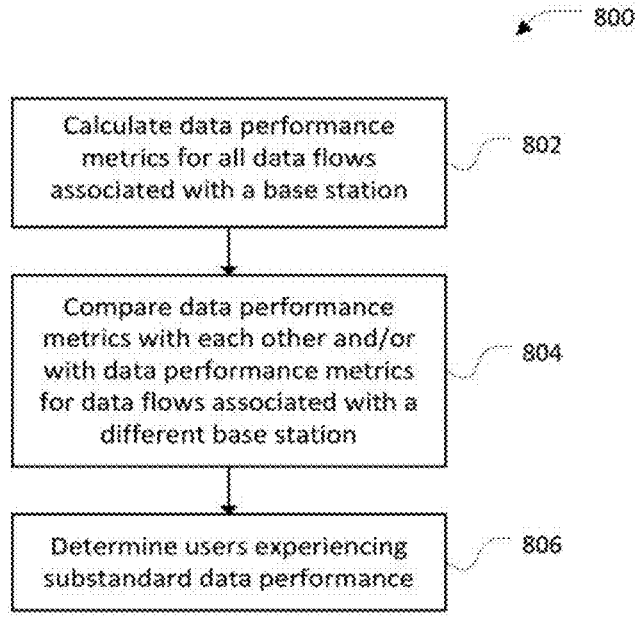
FIG. 8 illustrates a process for determining which users associated with a base station have substandard data performance according to an embodiment.

FIG. 8 illustrates a process 800 for determining which users associated with a base station have substandard data performance according to an embodiment.

In some embodiments the data performance characteristics as described above are used to infer control information, such as a radio channel link quality, associated with a given data flow. In such applications, data delivery performance of data flows directed to individual users and thus their unique UEs (such as, e.g., user equipment 102) may be differentiated from overall performance of the wireless data delivery network. The differentiation may be conducted via statistical evaluation of individual data flows compared to overall data flows to other UEs utilizing the same wireless access network.

In an embodiment, the data performance metrics for all data flows considered in the algorithm are associated with a particular wireless base station (e.g. NodeB, eNB, etc.) radio link coverage cell at step 802. The data performance metrics for each data flow may be sorted by individual user, so that data performances for the user equipment devices using the same cell may be compared.

At step 804, the data performance metrics for all of the data flows are compared. The data performance metrics may be compared with each other. Data flow outliers associated with the particular wireless base station may be determined by comparing the data performance metrics for all of the data flows associated with the particular base station. In addition, the data performance metrics for all of the data flows associated with the particular wireless base station may be compared to data performance metrics for data flows associated with different base stations. The data may be statistically compared using known methods such as correlations or plotted distribution functions (e.g. CDFs, PDFs).

At step 806, the data performance metric comparisons are used in order to determine which if any users are experiencing substandard data delivery performance relative to other users of the same wireless base station radio link coverage cell.

The users experiencing substandard data delivery performance may be determined using a form of outlier analysis that may be implemented heuristically or by other methods. For example, all users in the cell with data latency characteristics more than 2 standard deviations above the cell mean may be defined as high latency outliers for purposes of defining poor radio link channels to those users. In another example, the high latency outliers may be determined using a Spearman's rank correlation coefficient. By determining the high latency outliers, an assignment and or ranking of relative radio link channel quality values of data flows associated with the cell can be inferred from the data delivery performance measurements.

As an example, delay data may be collected over a defined time period for all users of a particular cell. For illustration purposes, delay data may be collected over a one minute observation period for all users of the cell of interest. The following cell and user level performance metrics could be derived from this data set:

Total number of users transferring data over cell of interest during observation period;

Mean data packet latency for each user's data over the observation period;

Mean cell level data packet latency for all user's data over the observation period;

Standard deviation of user mean data packet latency across all users of the cell during observation period; and Identification of user data flows that demonstrate mean data packet latency more than X standard deviations above mean user flow data packet latency for cell over observation window.

X may be any real number. X could be defined dynamically based on historical performance of user data packet flow latency to a cell of interest, or may be derived from similar behavior across a plurality of neighboring cells to reflect typical data packet latency in a given market region.

For illustration purposes, consider the example of X being 1.5, such that the high latency outliers are defined as users with mean data packet latency metrics during the observation window that are more than 1.5 standard deviations above mean user flow data packet latency. High latency outliers would be identified as users with poor channel quality over the defined observation period, for example, a period of 1 minute.

Figure 9:
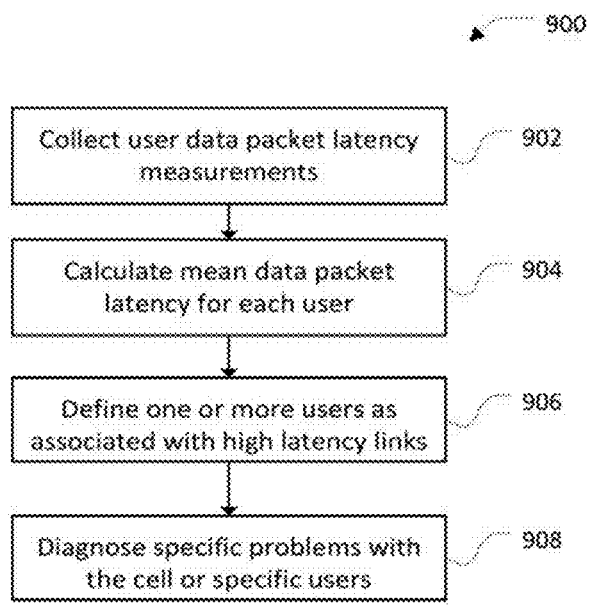
FIG. 9 illustrates a process for determining cell coverage quality can be determined based on absolute measurements according to an embodiment.

FIG. 9 illustrates a process 900 for determining cell coverage quality can be determined based on absolute measurements according to an embodiment. Using the process illustrated in FIG. 9, absolute data packet latency measurements may be defined as associated with good vs bad channels, and can be used to infer overall poor coverage.

At step 902, user data packet latency measurements are collected over an observation period of interest. The user data packet latency measurements may be collected for a plurality of users associated with a given cell. The observation period may be, e.g., 1 minute.

At step 904, a mean data packet latency for each user is calculated. The mean data packet latency may be estimated based on the measurements user's data latency over the observation period.

At step 906, one or more users are defined as associated with high latency links by defining each of the users with a mean data packet latency over the observation period that is greater than Y to be high latency links. Y can be any real number. In practice, Y could be determined by evaluating either the same cell performance over long time periods (e.g. hours, days, weeks) or could be determined by evaluating similar metrics collected at other cells in the same or similar market regions such as mean data latency statistics for all cells within a fixed distance or a group of defined cells in a similar deployment market (e.g. urban, dense urban, suburban markets, subsets of similar indoor or outdoor cells, etc.).

For illustration purposes, the parameter Y could also be set to a predetermined value based on typical engineering practices for similar data networks. For example, the acceptable data packet latency threshold could be set to 5 ms based on knowledge of similar networks, in which user traffic flows determined to have mean packet latencies greater than 5 ms over the observation window have been identified as high latency user data flows.

Using a combination of the above methods, a user can be determined to have a statistically high data latency characteristic over an observation period relative to other users in same network and/or cell.

At step 908, specific issues with the cell or specific users are diagnosed based on the users that are associated with high latency links. For example, when other users are below the high latency threshold, a user with the high data latency characteristic can be identified as having a poor communications channel.

In an embodiment where all users in a given cell are identified as high latency users based on absolute thresholds, the overall cell may be identified as performing poorly over the observation period.

In an embodiment where all users in the cell are defined as having poor data latency, but no particular outlier users are determined statistically, overall cell congestion during the observation period can be inferred.

Further metrics, such as a number of connected users in multiple cells or a total data volume delivered over the observation period via different cells, can be utilized to differentiate between congested cells vs poorly performing, yet uncongested, cells.

The examples above describe collection of user data latency metrics over a defined observation period. In other implementations of the present disclosure, data latency metrics can be continuously collected and analyzed.

For example, a single data set may be collected and analyzed over a given observation period, and longer term behavior of user traffic can be collected and analyzed over subsequent contiguous or noncontiguous observation periods. Hence, user communications channel quality and or overall serving base station conditions can be observed over time.

A continuous measurement and reporting scheme with successive data collection and analysis time periods can provide very high resolution data, but a periodic time sampling method could also be used to minimize data processing and data storage associated with channel quality estimation. An example of such a sampled scheme could include observing 30 seconds of user data traffic latency every five minutes in an operational network as a means of monitoring overall link quality, while minimizing data processing system loading and or data storage needs.

Figure 10:
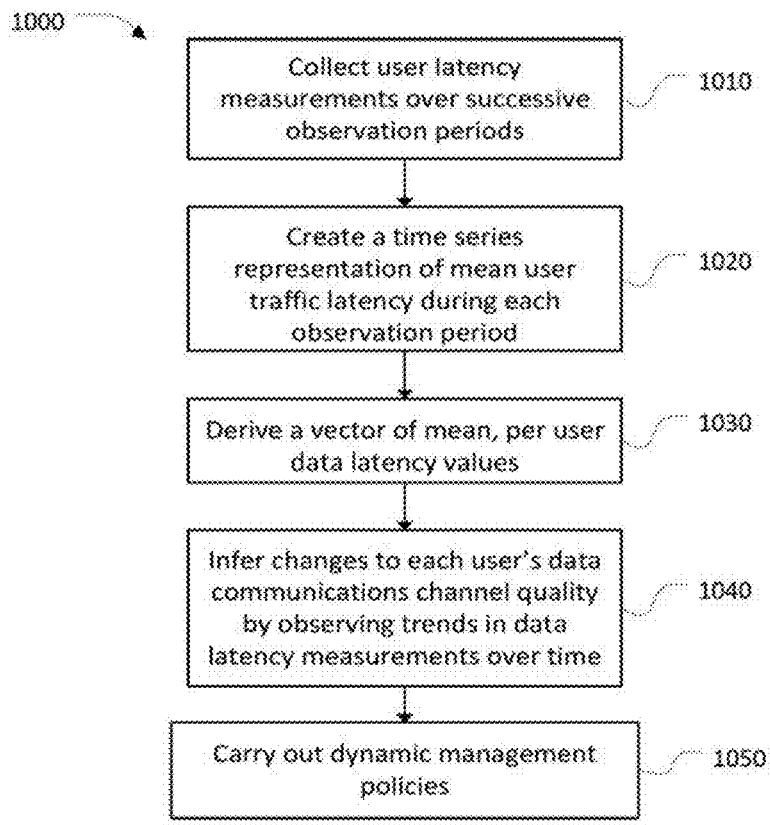
FIG. 10 illustrates a process for tracking user data latency and user communications channel quality over time according to an embodiment.

FIG. 10 illustrates a process 1000 for tracking user data latency and user communications channel quality over time according to an embodiment. Implementations of the present disclosure that utilize successive contiguous or noncontiguous data collection and processing as described above could further include tracking the user data latency and, by inference, the user communications channel quality over time.

At step 1010, user data latency measurements are collected over successive observation periods.

At step 1020, a time series representation of mean user traffic latency during each observation period is created.

At step 1030, a vector of mean, per user data latency values are derived using the time series representation of the mean user traffic latency.

At step 1040, changes to each user's data communications channel quality can be inferred by observing trends in the user's data latency measurements over time.

In an embodiment, certain issues with user equipment devices associated with the users can be diagnosed based on the data communications channel quality. For example, user equipment devices that experience transient poor channel quality but overall acceptable channel quality, as inferred by latency or other performance measurements, can be assumed to have travelled into or out of poor communications channel regions or otherwise have had their data communications capabilities temporarily compromised. For example, these user equipment devices can be determined to be experiencing transient interference or transient cell congestion. In a specific example, users that experience persistent poor channel quality may be identified as stationary in a network area with poor coverage.

The transport manager may further adapt a management function to the data flow based on the diagnosed issues. That is, in step 1050, the diagnosed issues can then be addressed by carrying out dynamic management policies based on the diagnosed issues. In an embodiment, the transport manager derives a general model of expected traffic behavior based on the control information. The transport manager may further adapt model parameters based on diagnosed issues. For example, the transport manager may have an expected traffic behavior model (e.g. throughput or latency performance) for a given piece of control information (e.g., the network is an LTE network), where it may increase or decrease the expected performance based on the diagnosed issue. The transport manager may then adapt data delivery based on the new expectation, where the adaptation may include rate limiting, buffering and other similar data flow modulation techniques.

User data quality dynamics that have been measured over time may be used, in some embodiments, by scheduling tools or other network devices to improve user experience, or to avoid allocating excessive resources to users with poor channel quality. The scheduling tools may be part of the management server.

Figure 11:
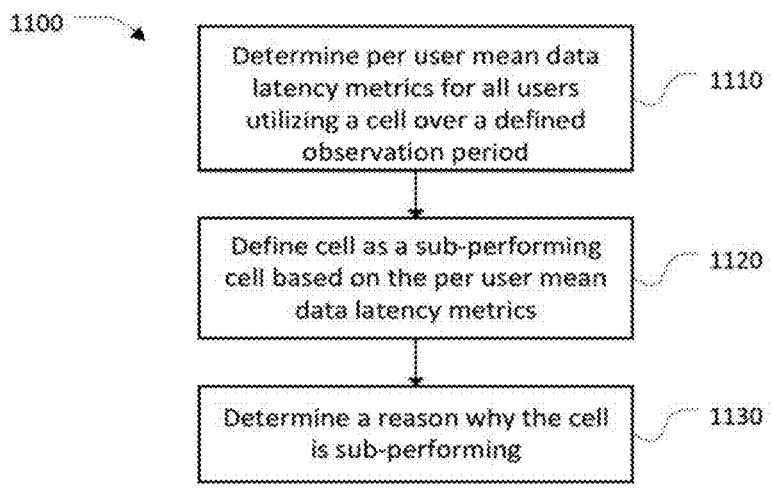
FIG. 11 illustrates a process for inferring overall base station data delivery performance relative to other network base stations, to other cells of the same base station, or to other cells of another particular base station according to an embodiment.

FIG. 11 illustrates a process 1100 for inferring overall base station data delivery performance relative to other network base stations, to other cells of the same base station, or to other cells of another particular base station according to an embodiment.

For instance, if user data latency measurements for many or all users in a cell are unacceptably high relative to other area cells or relative to predetermined limits, the cell in question can be identified as a poorly performing cell. Additional comparisons of cell loading metrics such as number of active users, total data volume transferred over a defined observation time period, or similar metrics, may be used to differentiate between congested cells versus nominally loaded yet sub-performing cells.

For example, in step 1110, per user mean data latency metrics are determined over a defined observation period (e.g., 1 minute) for all users utilizing a given cell. Various characteristics of the cell, user equipment, and base station can be inferred based on the data latency metrics.

At step 1120, the cell is defined as a sub-performing cell based on the per user mean data latency metrics. As described previously, if most or all users are experiencing excessive data packet latency as defined by absolute or relative comparisons (e.g., compared to a predetermined set latency cutoff or relative to latencies of other area cells or relative to same cell during other time periods) the cell can be determined to be sub-performing from a data delivery latency standpoint.

At step 1130, a reason why the cell is sub-performing may be determined. For example, when sub-performing cells as determined above have a low to nominal number of active users, and/or have low to nominal amounts of total data transferred relative to area cells or relative to pre-determined data volumes over this observation period, the cell may be inferred to be experiencing poor performance, not as a function of data traffic volume, but due to other reasons.

In another example, if relatively high data packet latency is observed repeatedly over time, and is shown to be correlated with traffic loading, the cell configuration, e.g., the data backhaul (i.e. data networking between wireless base station and wireless system core network—landline network), may be inferred as insufficient relative to frequent data loading needs.

In another example, historical data traffic latency measurements can be used to determine why the cell is sub-performing in step 1130. If the serving base station in question has historically handled the same or higher data traffic loads without experiencing high data traffic latency across most or all users, the cell capabilities may be inferred to be degrading either due to configuration difficulty (e.g. backhaul issues), or due to other difficulties associated with degrading channel conditions, such as increasing local interference issue, issues with antenna tilt, issues resulting from network changes (e.g. newly added nearby cells creating excessive interference), etc.

Accordingly, embodiments of the present disclosure may be used to identify sub-performing cells, and to determine issues related to backhaul quality or other degrading factors (e.g. local radio frequency interference sources near the sub-performing base station). The detection of such sub-performing cells based on data performance may include utilizing statistical methods of comparing all flows of a given base station to all other bases stations operating within the region (e.g. market region).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

Although aspects of the present technology have been described with respect to specific examples, embodiments of the present technology are not limited by these examples. For example, persons of skill in the art will recognize that selecting media content delivery policies may be performed according to various algorithms without departing from the scope or spirit of the present technology.

What is claimed is:

1. A method, comprising:
    measuring, by a transport manager, a delivery performance between a user equipment in a Radio Access Network (RAN) and the transport manager by inspecting a plurality of data packets in a data flow between the user equipment and a content provider, the transport manager being connected between the RAN and the content provider in an end-to-end path of the plurality of packets; and
    inferring, by the transport manager using the measured delivery performance, control information associated with the data flow, wherein the plurality of data packets do not directly include the control information, and wherein the control information is pre-existing control information.

2. The method of claim 1, wherein measuring the delivery performance between the transport manager and the user equipment by inspecting a plurality of data packets in the data flow comprises measuring a round-trip-time (RTT) latency of the plurality of packets between the transport manager and the user equipment.

3. The method of claim 2, wherein measuring the RTT latency of the plurality of packets between the transport manager and the user equipment includes:
measuring a plurality of RTT latencies of the plurality of packets between the transport manager and the user equipment; and
determining a best case RTT by filtering the plurality of RTT latencies.

4. The method of claim 2, wherein measuring the RTT latency of the plurality of packets between the transport manager and the user equipment includes:
measuring the RTT latency by determining a difference between a first time and a second time or a difference between a second time and a third time,
wherein the first time is when the transport manager forwards a first packet from the user equipment to the content provider,
wherein the second time is when the transport manager receives a second packet from the content provider, the second packet being forwarded to the user equipment in response to the first packet, and
wherein the third time is when the transport manager receives a third packet from the user equipment, the third packet being forwarded to the content provider in response to the second packet.

5. The method of claim 4, wherein the data flow includes a handshake between the user equipment and the content provider, the handshake including the first packet and the second packet.

6. The method of claim 1, wherein inferring the control information associated with the flow using the measured delivery performance includes:
determining a change in the measured delivery performance; and
determining that the user equipment is handed over from a first network to a second network based on the change in the measured delivery performance.

7. The method of claim 1, wherein inferring the control information associated with the data flow using the measured delivery performance further includes:
determining a type of the RAN based on historical delivery performance characteristics; and
predicting a future delivery performance of the data flow based on the determined type of the RAN.

8. The method of claim 1, further comprising:
determining a coverage quality of a cell in which the user equipment is operating by comparing the control information associated with the data flow of the user equipment to control information associated with other data flows of other user equipment in the cell.

9. The method of claim 1,
wherein the transport manager infers the control information without receiving the control information from the RAN.

10. The method of claim 1, further comprising:
applying a management function to the data flow based on the control information.

11. A system including a transport manager, the transport manager comprising:
one or more processors; and
a non-transitory computer readable medium comprising computer executable instructions which, when executed by the one or more processors, causes the transport manager to:
measure a delivery performance between a user equipment in a radio access network (RAN) and the transport manager by inspecting a plurality of data packets in a data flow between the user equipment and a wide-area data network, the transport manager being connected between the RAN and the wide-area data network in an end-to-end path of the plurality of packets; and
infer control information associated with the data flow using the measured delivery performance, wherein the plurality of data packets do not directly include the control information, and wherein the control information is pre-existing control information.

12. The system of claim 11, wherein measuring the delivery performance between the transport manager and the user equipment by inspecting a plurality of data packets in the data flow comprises measuring a round-trip-time (RTT) latency of the plurality of packets between the transport manager and the user equipment.

13. The system of claim 12, wherein measuring the RTT latency of the plurality of packets between the transport manager and the user equipment comprises:
measuring a plurality of RTT latencies of the plurality of packets between the transport manager and the user equipment; and
determining a best case RTT latency by filtering the plurality of RTT latencies.

14. The system of claim 12, wherein the transport manager measures the RTT latency of the plurality of packets between the transport manager and the user equipment by:
measuring the RTT latency by determining a difference between a first time and a second time or a difference between a second time and a third time,
wherein the first time is when the transport manager forwards a first packet from the user equipment to the content provider,
wherein the second time is when the transport manager receives a second packet from the content provider, the second packet being forwarded to the user equipment in response to the first packet,
wherein the third time is when the transport manager receives a third packet from the user equipment, the third packet being forwarded to the content provider in response to the second packet, and
wherein the data flow includes a handshake between the user equipment and the content provider, the handshake including the first packet and the second packet.

15. The system of claim 11, wherein the transport manager infers the control information associated with the flow using the measured delivery performance by:
determining a change in the measured delivery performance; and
determining that the user equipment is handed over from a first network to a second network based on the change in the measured delivery performance.

16. The system of claim 11, wherein the transport manager infers the control information associated with the data flow using the measured delivery performance by:
determining a type of the RAN based on historical delivery performance characteristics; and
predicting a future delivery performance of the data flow based on the determined type of the RAN.

17. The system of claim 11, wherein the computer executable instructions which, when executed by the one or more processors, further causes the transport manager to:
apply a management function to the data flow based on the control information.

18. A non-transitory computer-readable storage medium whose contents, when executed by a computer included in a transport manager, cause the computer to perform operations comprising:

measuring a plurality of round-trip-time (RTT) latencies between a user equipment in a radio access network (RAN) and the transport manager of a plurality of packets in a data flow between the user equipment and a content provider, the transport manager being connected between the RAN and the content provider in an end-to-end path of the plurality of packets; and inferring control information associated with the data flow using the plurality of RTT latencies, wherein the control information is pre-existing control information.

19. The non-transitory computer-readable storage medium of claim 18, wherein the control information includes network attachment information, radio link quality information, or both.

20. The non-transitory computer-readable storage medium of claim 18, wherein inferring control information associated with the data flow using the plurality of RTT latencies includes:

determining a type of the RAN based on historical delivery performance characteristics; and predicting a future delivery performance of the data flow based on the determined type of the RAN.

* * * * *